US010422392B2

United States Patent
Shibata et al.

(10) Patent No.: US 10,422,392 B2
(45) Date of Patent: Sep. 24, 2019

(54) UNIDIRECTIONAL CLUTCH

(71) Applicant: NSK-WARNER K.K., Shinagawa-ku, Tokyo (JP)

(72) Inventors: Hiroshi Shibata, Fukuroi (JP); Tomoharu Andou, Fukuroi (JP); Hiroki Segawa, Fukuroi (JP); Hirobumi Shirataki, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 219 days.

(21) Appl. No.: 15/514,522

(22) PCT Filed: Dec. 14, 2015

(86) PCT No.: PCT/JP2015/084911
§ 371 (c)(1),
(2) Date: Mar. 26, 2017

(87) PCT Pub. No.: WO2016/104215
PCT Pub. Date: Jun. 30, 2016

(65) Prior Publication Data
US 2017/0227071 A1 Aug. 10, 2017

(30) Foreign Application Priority Data
Dec. 22, 2014 (JP) .................... 2014-258816

(51) Int. Cl.
*F16D 41/06* (2006.01)
*F16D 41/07* (2006.01)

(52) U.S. Cl.
CPC ...... *F16D 41/07* (2013.01); *F16D 2041/0603* (2013.01); *F16D 2041/0605* (2013.01)

(58) Field of Classification Search
CPC ............. F16D 41/07; F16D 2041/0603; F16D 2041/0605
See application file for complete search history.

(56) References Cited

U.S. PATENT DOCUMENTS 2,683,509 A    7/1954   Jandasek
4,360,093 A * 11/1982   Wakabayashi .......... F16D 41/07
                                                                                                      192/41 A
(Continued)

FOREIGN PATENT DOCUMENTS

EP        0 960 668 A2    12/1999
GB          662601 A    12/1951
(Continued)

OTHER PUBLICATIONS

English translation of International Preliminary Report on Patentability from International Patent Application No. PCT/JP2015/084911, dated Jun. 22, 2017.
(Continued)

*Primary Examiner* — David J Hlavka
(74) *Attorney, Agent, or Firm* — Shapiro, Gabor and Rosenberger, PLLC

(57) ABSTRACT

A one-way clutch 1 includes: an inner race 3; an outer race 5; a plurality of cams 7 interposed between an inner race outer peripheral surface 11 and an outer race inner peripheral surface 13 and serving to transfer a torque to between the inner race 3 and the outer race 5; a retaining mechanism retaining the plurality of cams 7; and a spring member 15 biasing the plurality of cams 7 to torque non-transfer positions, and the retaining mechanism includes a first retainer 9 fixed to the outer race 5 and having a cylindrical retaining portion 21 retaining the plurality of cams 7 at a predetermined interval in a circumferential direction, and a second retainer 29 disposed on an inner diametrical side of the cylindrical retaining portion 21, retaining the plurality of cams 7 in a swingable manner, and elastically deformable corresponding to the swings of the plurality of cams 7 when swinging in a torque transferring direction upon engagements of the plurality of cams 7 with the inner race outer (Continued)

peripheral surface 11 and the outer race inner peripheral surface 13.

12 Claims, 4 Drawing Sheets

(56) References Cited

U.S. PATENT DOCUMENTS

| | | | |
|---|---|---|---|
| 4,494,636 A | | 1/1985 | Wakabayashi et al. |
| 4,928,801 A | | 5/1990 | Laurent |
| 5,038,903 A | | 8/1991 | Akagi et al. |
| 5,758,755 A | | 6/1998 | Igari |
| 6,044,947 A | * | 4/2000 | Kinoshita .............. F16D 41/067 |
| | | | 192/41 A |
| 6,050,378 A | * | 4/2000 | Muramatsu .............. F16D 41/07 |
| | | | 192/41 A |
| 6,079,534 A | * | 6/2000 | Ando ...................... F16D 41/07 |
| | | | 192/110 B |
| 6,125,978 A | * | 10/2000 | Ando ...................... F16D 41/07 |
| | | | 192/41 A |

FOREIGN PATENT DOCUMENTS

| | | |
|---|---|---|
| GB | 2 061 418 A | 5/1981 |
| JP | 58-163832 A | 9/1983 |
| JP | H09-014302 A | 1/1997 |
| JP | 10-009291 A | 1/1998 |
| JP | 11-201194 A | 7/1999 |
| JP | H11-325123 A | 11/1999 |
| JP | 2005-351481 A | 12/2005 |

OTHER PUBLICATIONS

International Search Report from International Patent Application No. PCT/JP2015/084911, dated Mar. 1, 2016.

Extended European search report for European Patent Application No. 15200584.9, dated Mar. 17, 2016.

* cited by examiner

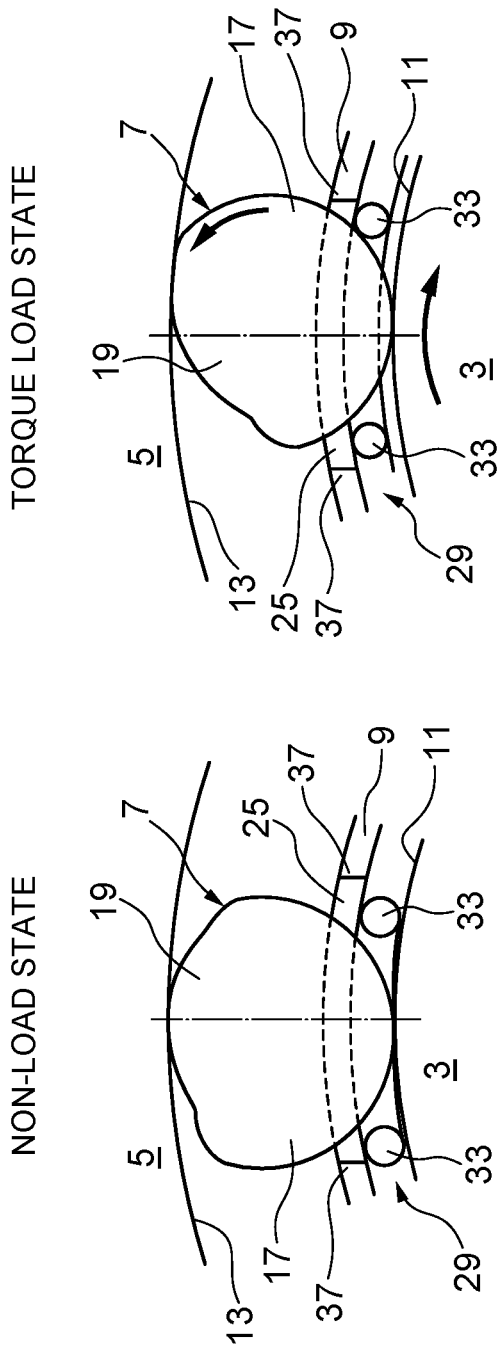

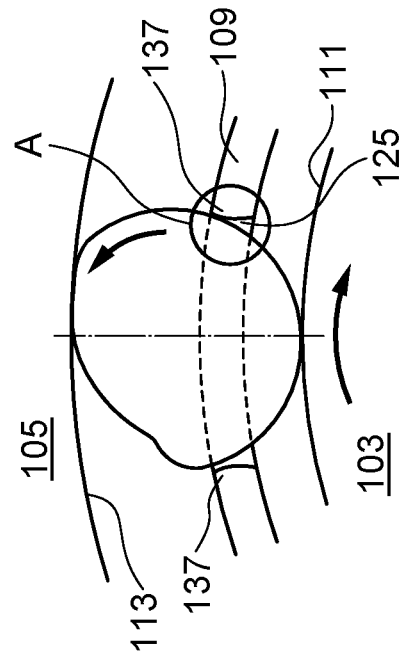
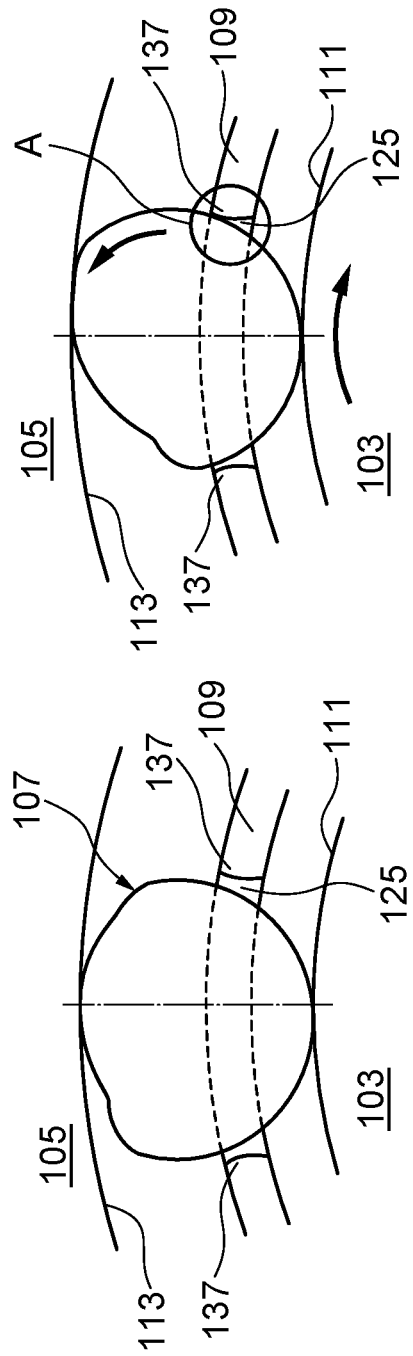

UNIDIRECTIONAL CLUTCH

TECHNICAL FIELD

The present invention relates to a one-way clutch used for transferring a torque in a vehicle and an industrial machine.

BACKGROUND ART

Some of conventional one-way clutches have, in Japanese Patent Application Laid-Open Publication No. H09-014302 for example, a so-called single cage type structure that includes a single cage (retainer) for retaining a plurality of sprags. Another one-way clutch configured by modifying the single cage type improves meshing performance of the one-way clutch to further solidify integration of the retainer and an outer race by providing notches or cuts in a flange portion of the retainer to give, as in Japanese Patent Application Laid-Open Publication No. H10-009291 for example, elasticity to the retainer.

FIG. 3A is a schematic outline view illustrating a state of a conventional one-way clutch 101 described in Japanese Patent Application Laid-Open Publication No. H10-009291 as viewed from one side in an axial direction; FIG. 3B is a sectional view taken along an arrow line b-b in FIG. 3A; and FIG. 3C is a schematic outline view illustrating a state of the one-way clutch 101 as viewed from the other side in the axial direction. Note that FIGS. 3A, 3B and 3C omit illustrations of an inner race and an outer race.

As illustrated in FIGS. 3A, 3B and 3C, the conventional one-way clutch 101 includes: a plurality of cams 107 serving to transfer a torque to between an inner race 103 (see FIGS. 4A and 4B) and an outer race 105 (see FIGS. 4 A and 4B); a ring-shaped retainer 109 retaining the plurality of cams 107 at a predetermined interval in a circumferential direction; and a spring member 115 biasing the plurality of cams 107 in such a direction as to come into contact with an outer peripheral surface 111 of the inner race 103 and an inner peripheral surface 113 of the outer race 105 in a torque non-transfer state. The retainer 109 is configured to include a cylindrical portion 121 disposed between the inner race outer peripheral surface 111 and the outer race inner peripheral surface 113, and a flange portion 123 formed at one end of the cylindrical portion 121, and the cylindrical portion 121 is provided with a plurality of windows 125 for retaining the cams 107 in a swingable manner. The cams 107 are fitted in these windows 125 in one-to-one correspondence.

DOCUMENTS OF PRIOR ARTS

Patent Documents

[Patent Document 1] Japanese Patent Application Laid-Open Publication No. H09-014302
[Patent Document 2] Japanese Patent Application Laid-Open Publication No. H10-009291

SUMMARY OF THE INVENTION

Problems to be Solved by the Invention

FIGS. 4A and 4B are enlarged sectional views of a principal portion, depicting a state of a cam 107 of the one-way clutch 101 illustrated in FIGS. 3A, 3B, and 3C; FIG. 4A illustrates a non-load state; and FIG. 4B depicts a torque load state.

As illustrated in FIG. 4A, a window 125 of the retainer 109 is configured to have such a size that a couple of edge portions 137, 137 facing each other in a peripheral direction are disposed in close proximity to an outer peripheral surface of the cam 107 in order to stably retain the cam 107. When a torque is applied to an inner race 103 from the non-load state illustrated in FIG. 4A, the cam 107 swings in a torque transferring direction so that the inner race 103 and an outer race 105 are coupled with each other through the cam 107. To be specific, as illustrated in FIG. 4B, when the inner race 103 rotates clockwise, i.e. rightward as viewed on a sheet surface, the cam 107 kept in contact with an inner race outer peripheral surface 111 swings counterclockwise in a leftward rotating direction. The cam 107 is displaced rightward along with this swing as viewed on the sheet surface in FIG. 4B with respect to the inner race outer peripheral surface 111. The cam 107 is brought into engagement with the inner race outer peripheral surface 111 and an outer race inner peripheral surface 113 due to the swing involving the displacement described above, and the torque is transferred to the outer race 105 from the inner race 103 by this engagement. When the swing of the cam 107 reaches a predetermined magnitude, as indicated by an encircled portion A in FIG. 4B, the outer peripheral surface of the cam 107 contacts an edge portion 137 of the window 125 of the retainer 109.

When the cam 107 thus contacts the edge portion 137 of the window 125, it happens as the case may be that the cam 107 causes a scatter in swing stability due to a contact with the retainer 109 because of the retainer 109 having a high rigidity for ensuring stability of a torque capacity. Specifically, a torque (which will hereinafter be termed a "maximum load torque") having a magnitude equal to or larger than the maximum torque transferable by the cam 107 in terms of design is applied to the inner race 103, in which state there occurs a scatter in magnitude of the torque (which will hereinafter be termed a "transfer torque with a maximum load") actually transferred by the cam 107 to the outer race 105 from the inner race 103. This scatter has a predetermined width.

In the case of designing the conventional one-way clutch 101 to be flexible to the high torque capacity, though there are increased the torque applied to the inner race 103 and the torque transferred by the cam 107, the one-way clutch 101 causes the scatter in magnitude of the transfer torque with the maximum load as the case may be, and therefore needs to be designed by taking account of the width of this scatter. Even when the torque capacity rises in terms of design, and if the scatter width of the magnitude of the transfer torque with the maximum load can be reduced, the one-way clutch 101 which has the optimized number of cams 107 to enable the necessary torque to be ensured, can be designed. In other words, if the swing stability of the cam 107 is ensured in a state of the maximum load torque being applied to the inner race 103, the torque capacity can be increased without changing a dimension of the conventional one-way clutch 101.

Over the recent years, there has been increasingly a demand for applying the high torque capacity to the one-way clutch used for, especially, a starter of a two-wheeled vehicle. The one-way clutch having a current specification can be applied to the high torque capacity by taking account of the scatter width of the magnitude of the transfer torque with the maximum load in the one-way clutch. In this case, it is considered to increase the number of cams or a dimension of the camas a design for ensuring the stability of the torque capacity after taking account of the scatter width of the magnitude of the transfer torque with the maximum load. These increases, however, lead to increasing a weight of the one-way clutch and up-sizing the clutch.

It is an object of the present invention, which is devised under such circumstances, to provide a one-way clutch enabling respective cams to exhibit their functions and the plurality of provided cams to ensure a maximum torque capacity without being up-sized.

Means for Solving the Problems

To accomplish the object described above, a one-way clutch according to the present invention includes: an inner race; an outer race being disposed coaxially with the inner race; a plurality of cams being interposed between an outer peripheral surface of the inner race and an inner peripheral surface of the outer race, and serving to transfer a torque between the inner race and the outer race; a retaining mechanism retaining the plurality of cams; and a spring member biasing the plurality of cams to torque non-transfer positions, wherein the retaining mechanism has a first retainer being fixed to the outer race and having a cylindrical retaining portion retaining the plurality of cams at a predetermined interval in a circumferential direction, and a second retainer being disposed on an inner diametrical side of the cylindrical retaining portion, retaining the plurality of cams in a swingable manner, and being elastically deformable corresponding to the swings of the plurality of cams when swinging in a torque transferring direction upon engagements of the plurality of cams with the inner race outer peripheral surface and the outer race inner peripheral surface.

In a preferable aspect of the present invention, the second retainer is a ring-shaped member formed of an elongated thin member bent in a rectangular wavy shape of open portions being alternately directed to one axis-directional side of the one-way clutch and to the other axis-directional side thereof.

In another preferable aspect of the present invention, the cylindrical retaining portion is disposed between the inner race and the outer race coaxially with the inner race and the outer race, and a plurality of windows are formed through the cylindrical retaining portion in a radial direction, the plurality of cams being fitted into the windows respectively.

In still another preferable aspect of the present invention, the elongated thin member bent in the rectangular wavy shape includes rectangular portions each configuring a frame portion with one side or the other side being opened, the frame portions are disposed overlapping in the radial direction with the windows provided in the cylindrical retaining portion, and the plurality of cams are respectively retained by the frame portions and the windows overlapped with each other in the radial direction.

In yet another preferable aspect of the present invention, the frame portion is configured to include a couple of axis-directional extending portions, extending in an axial direction and facing each other in a peripheral direction, of the elongated thin member, and periphery-directional extending portions, extending in the peripheral direction and connecting one axis-directional ends or the other axis-directional ends of the couple of axis-directional extending portions, of the elongated thin member.

In yet another preferable aspect of the present invention, upon the plurality of cams swinging in a torque transferring direction by engaging with the inner race outer peripheral surface and the outer race inner peripheral surface respectively, each cam swings to contact one of the couple of axis-directional extending portions of the frame portions, and thereafter contacts one of the couple of edge portions, facing each other in the peripheral direction, of the window.

In a further preferable aspect of the present invention, upon the plurality of cams swinging in the torque transferring direction by engaging with the inner race outer peripheral surface and the outer race inner peripheral surface respectively, the plurality of cams each swings to be displaced with respect to the inner race outer peripheral surface, and contacts one axis-directional extending portion due to the displacement, and the second retainer elastically deforms so that one axis-directional extending portion contacting the cam moves in the same direction as the displacing direction of the cam corresponding to the displacement of the cam.

In a still further preferable aspect of the present invention, the window is configured to have a size to contact the cam upon the cam swinging to an engaging position enabling a transfer of a maximum torque to between the inner race and the outer race.

Effect of the Invention

According to the present invention, it is feasible to provide the one-way clutch enabling the respective cams to surely exhibit their functions and the plurality of provided cams to ensure the maximum torque capacity without being up-sized.

BRIEF DESCRIPTION OF THE DRAWINGS

FIGS. 2A and 2B are enlarged sectional views of a principal portion, depicting a state of a cam of the one-way clutch according to the embodiment; FIG. 2A illustrates a non-load state; and FIG. 2B depicts a torque load state;

FIGS. 4A and 4B are enlarged sectional views of a principal portion, depicting a state of a cam of the one-way clutch according to the conventional example; FIG. 4A illustrates a non-load state; and FIG. 4B depicts a torque load state.

DESCRIPTION OF SPECIFIC EMBODIMENT

An embodiment of a one-way clutch according to the present invention will hereinafter be described with reference to the drawings. The one-way clutch according to the present embodiment is of a type of transferring the torque to an outer race from an inner race. Note that an axial direction, a radial direction and a peripheral direction simply described herein, unless particularly specified, correspond to the axial direction, the radial direction and the peripheral direction of the one-way clutch in the present specification. In other words, these directions correspond to the axial direction, the radial direction and the peripheral direction pertaining to the inner race or the outer race.

Figure 1A:
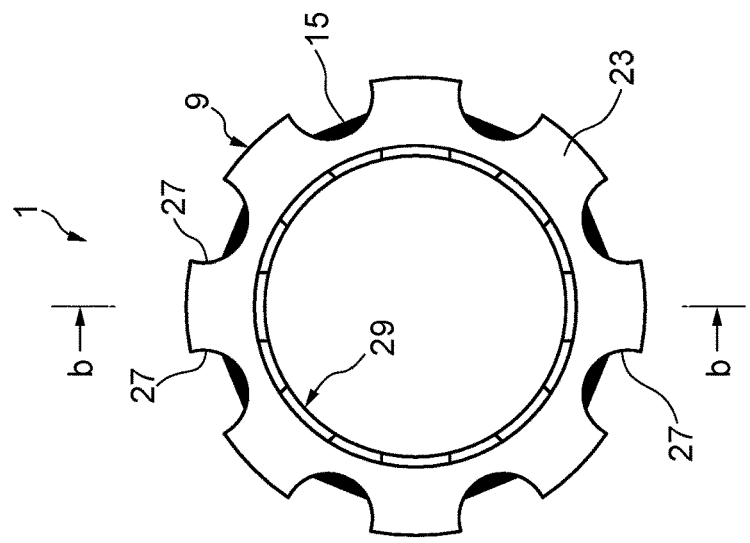
FIG. 1A is a schematic outline view illustrating a state of a one-way clutch according to an embodiment as viewed from one side in an axial direction.
Figure 1B:
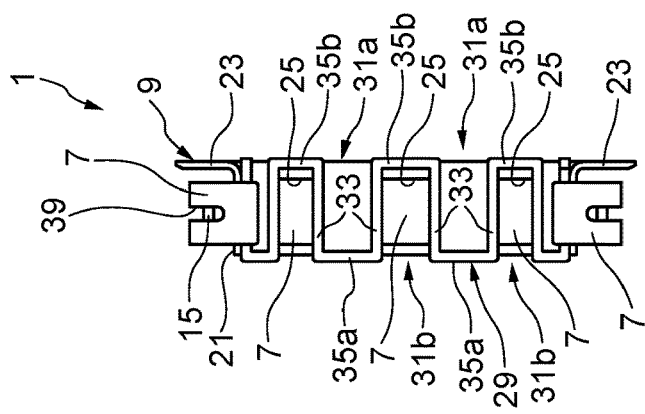
FIG. 1B is a sectional view taken along an arrow line b-b in FIG. 1A.
Figure 1C:
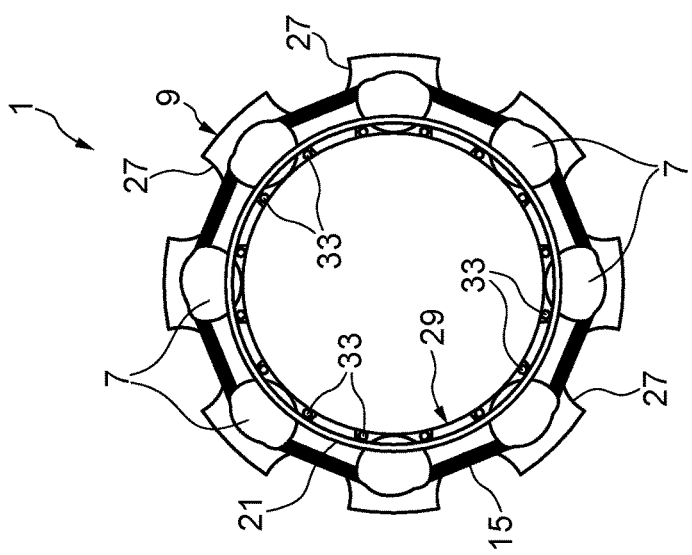
FIG. 1C is a schematic outline view illustrating a state of the one-way clutch as viewed from the other side in the axial direction.
Figure 3A:
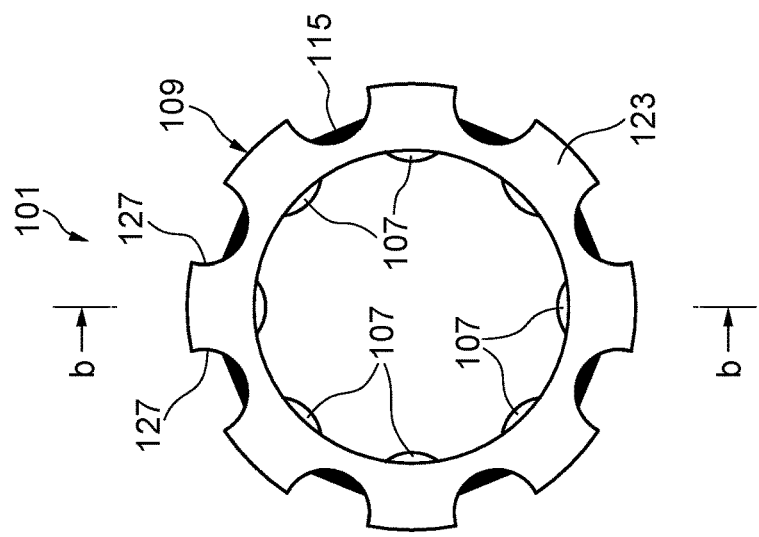
FIG. 3A is a schematic outline view illustrating a state of a one-way clutch according to a conventional example as viewed from one side in the axial direction.
Figure 3B:
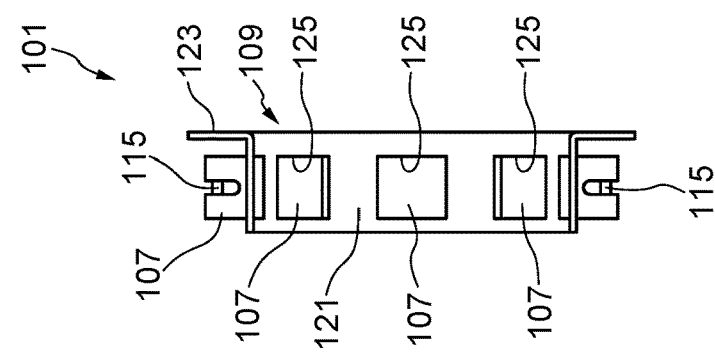
FIG. 3B is a sectional view taken along an arrow line b-b in FIG. 3A.
Figure 3C:
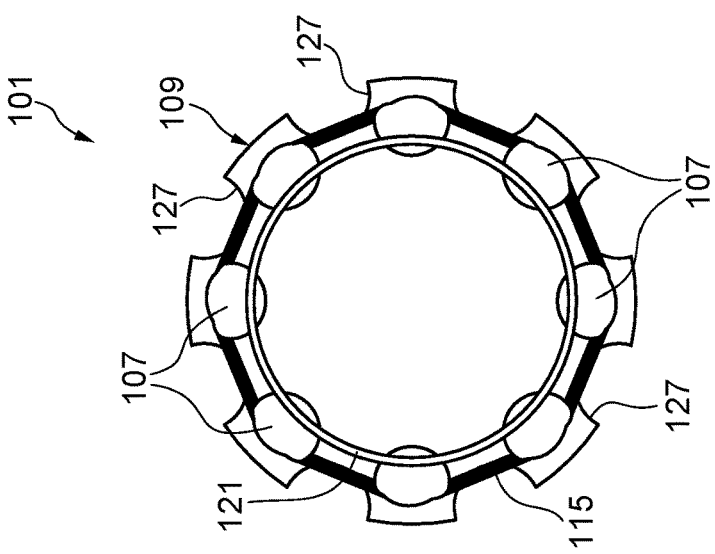
FIG. 3C is a schematic outline view illustrating a state of the one-way clutch as viewed from the other side in the axial direction.

FIG. 1A is a schematic outline view illustrating a state of a one-way clutch 1 according to the embodiment as viewed from one side in the axial direction; FIG. 1B is a sectional view taken along an arrow line b-b in FIG. 1A; and FIG. 1C is a schematic outline view illustrating a state of the one-way clutch 1 as viewed from the other side in the axial direction. Note that illustrations of the inner race and the outer are omitted in FIGS. 1A, 1B and 1C. FIGS. 2A and 2B are enlarged sectional views of a principal portion, depicting a state of a cam of the one-way clutch 1 according to the embodiment; FIG. 2A illustrates a non-load state; and FIG. 2B depicts a torque load state.

As illustrated in FIGS. 1A, 1B and 1C, the one-way clutch 1 according to the embodiment includes: an inner race 3 (see FIGS. 2A and 2B) and an outer race 5 (see FIGS. 2A and 2B) that are concentrically disposed; a plurality of cams 7 disposed between the inner race 3 and the outer race 5; a first ring-shaped retainer 9 for retaining the plurality of cams 7; and a spring member 15 for biasing the plurality of cams 7 in such a direction as to being into contact with an inner race outer peripheral surface 11 and an outer race inner peripheral surface 13 in a torque non-transfer state.

The plurality of cams 7 are torque transfer members each engages with the inner race outer peripheral surface 11 and the outer race inner peripheral surface 13, thereby transferring the torque to the outer race 5 from the inner race 3. The cam 7 is a columnar member elongated in the axial direction with its peripheral surface being a curved surface, and has a sectional shape that is configured by combining a substantially semicircular portion 17 with a swelling portion 19 swelling radially outward from a straight line connecting both ends of a circular arc of the substantially semicircular portion 17. The swelling portion 19 has its vertex portion taking a round and gently radially outwardly projecting or chevron shape. One end of a contour of the swelling portion 19 and one end of the circular arc of the substantially semicircular portion 17 are smoothly continuous, and the other end of the contour of the swelling portion 19 and the other end of the circular arc of the substantially semicircular portion 17 are smoothly continuous. The cam 7 is configured so that a length of a straight line connecting the vertex portion of the swelling portion 19 to a bottom portion of the circular arc of the substantially semicircular portion 17 is shorter than a length of a straight line connecting portions vicinal to the both ends of the circular arc of the substantially semicircular portion 17.

The first retainer 9 is composed of a metallic material and has high rigidity. The first retainer 9 includes, as illustrated in FIGS. 1A and 1B, a cylindrical portion 21 disposed between the inner race outer peripheral surface 11 and the outer race inner peripheral surface 13, and an annular flange portion 23 extending outward in the radial direction from an end portion, on one side (corresponding to a right side as viewed on the sheet surface of FIG. 1B) in the axial direction, of the cylindrical portion 21. The cylindrical portion 21 is disposed concentrically with the inner race 3 and the outer race 5. The cylindrical portion 21 is provided with a plurality of rectangular windows 25 each formed through the cylindrical portion 21 in the radial direction. The plurality of rectangular windows 25 are provided at a predetermined interval in the peripheral direction.

The flange portion 23 of the first retainer 9 is formed with a plurality of round cuts or notches 27 formed to open on an outer peripheral side in predetermined positions in the peripheral direction. Outer edges of portions, between the round cuts 27 adjacent to each other in the peripheral direction, of the flange portion 23 are fitted into a peripheral groove (unillustrated) formed in the outer race inner peripheral surface 13. With this fitted engagement, the first retainer 9 is fixed to the outer race inner peripheral surface 13, and the first retainer 9 and the respective cams 7 are positioned in the axial direction, and further the one-way clutch 1 is prevented from being rotated along with the outer race 5.

The one-way clutch 1 according to the embodiment further includes, as depicted in FIGS. 1A, 1B and 1C, a second retainer 29 for retaining the plurality of cams 7. To be specific, a retaining mechanism configured by the first retainer 9 and the second retainer 29 retains the plurality of cams 7. The second retainer 29 is fitted in an inner peripheral surface of the cylindrical portion 21 of the first retainer 9.

The second retainer 29 is composed of a wire classified as an elongated thin member. The second retainer 29 takes a ring shape by connecting both ends of the wire bent in a rectangular wavy shape, the configuration being such that there are, as illustrated in FIG. 1B, formed frame portions 31a, 31b each taking a substantially U-shape with one axis-directional side or the other axis-directional side (corresponding to the left side as viewed on the sheet surface in FIG. 1B, and the same is hereinafter applied) of one rectangular portion in the rectangular wavy shape being opened, and the frame portions 31a with one axis-directional sides being opened and the frame portions 31b with the other axis-directional sides being opened are alternately continuously formed in a side-by-side relationship in the peripheral direction.

The frame portions 31a with one axis-directional side being opened, in the plurality of frame portions 31a, 31b of the second retainer 29 each is configured by a couple of linear portions 33, 33 of the elongated thin member (which will hereinafter be referred to as "axis-directional extending portions 33") extending in the axial direction and being opposed to each other in the peripheral direction, and by a portion 35a of the elongated thin member extending in the peripheral direction and mutually connecting the other axis-directional ends of the couple of axis-directional extending portions 33, 33. The frame portion 31b, formed adjacent to the frame portion 31a in the peripheral direction, with the other axis-directional side being opened is configured by the couple of axis-directional extending portions 33, 33 and a portion 35b of the elongated thin member extending in the peripheral direction and mutually connecting one axis-directional ends of the couple of axis-directional extending portions 33, 33. The frame portions 31a, 31b are thus configured, and hence the frame portions 31a, 31b adjacent to each other are in common with one axis-directional extending portion 33. The second retainer 29 is thus configured in the ring shape by using the wire bent so that the opening portions are alternately directed toward the both sides in the axial direction, and is not therefore high in rigidity but has elasticity.

The second retainer 29 is disposed between the cylindrical portion 21 of the first retainer 9 and the inner race outer peripheral surface 11. In the state of being fitted into the first retainer 9, the frame portions, disposed alternately in the peripheral direction, of the second retainer 29, are overlapped with the windows 25 of the first retainer 9 in the radial direction. According to the embodiment, the frame portions 31b with the other axis-directional sides being opened are overlapped with the windows 25 of the first retainer 9 in the radial direction. As illustrated in FIG. 2A, a distance in the peripheral direction between the couple of axis-directional extending portions 33, 33 configuring the frame portion 31b of the second retainer 29 is set shorter than a distance between a couple of edge portions 37, 37

(which will hereinafter be termed "periphery-directional edge portions 37, 37"), opposed to each other in the peripheral direction, of the window 25 of the first retainer 9.

The plurality of cams 7 are fitted from the outer diametrical side into the windows 25 of the first retainer 9 in one-to-one correspondence, with the axial direction being coincident with the axial direction of the one-way clutch 1. The plurality of cams 7 are thereby retained by the first retainer 9 at a predetermined interval in a circumferential direction. Both end surfaces of the cam 7 in the axial direction are located inside of a couple of edge portions (unillustrated), facing each other in the axial direction, of the window 25 of the first retainer 9. In other words, a distance between the couple of edge portions, facing each other in the axial direction, of the window 25 is set larger than a dimension of the cam 7 in the axial direction. In a non-load state, the substantially semicircular portion 17 of the cam 7, as illustrated in FIG. 2A, faces the inner race 3, the bottom portion of the substantially semicircular portion 17 contacts the inner race outer peripheral surface 11, the swelling portion 19 faces the outer race 5, and the vertex portion of the swelling portion 19 contacts the outer race inner peripheral surface 13. The portion, i.e., the substantially semicircular portion 17 of the cam 7 opposed to the inner race 3 partially passes through the window 25 of the first retainer 9 to protrude on an inner diametrical side from the cylindrical portion 21.

The second retainer 29 is disposed in contact with or in close proximity to the peripheral surface of the portion, protruding on the inner diametrical side from the cylindrical portion 21, of the substantially semicircular portion 17 of the cam 7. Concretely, the couple of axis-directional extending portions 33, 33 configuring the frame portion 31b of the second retainer 29 are in contact with or in close proximity to the peripheral surface of the cam 7. The distance between the couple of axis-directional extending portions 33, 33 of the second retainer 29 is set to disable the cam 7 from passing through in the radial direction. Thus, the axis-directional extending portions 33, 33 of the second retainer 29 are disposed in contact with or in close proximity to the outer peripheral surface of the cam 7, whereby the cam 7 stably sits on the inner race outer peripheral surface 11 while being retained by the frame portion 31b of the second retainer 29. On the other side, the distance between the couple of periphery-directional edge portions 37, 37 of the first retainer 9 is set longer than the distance between the couple of axis-directional extending portions 33, 33 of the frame portion 31b of the second retainer 29, and hence, in the non-load state depicted in FIG. 2A, the couple of periphery-directional edge portions 37, 37 each faces the peripheral surface of the cam 7 at a predetermined interval. In other words, the periphery-directional edge portions 37, 37 are in non-contact with the outer peripheral surface of the cam 7. Such being the configuration, the cam 7 is swingable in slide-contact with the couple of axis-directional extending portions 33, 33 of the second retainer 29 but is restrained from moving in the axial direction by a couple of unillustrated axis-directional edge portions of the window 25 of the first retainer 9.

Each cam 7 has, as illustrated in FIG. 1B, a groove 39 extending in the peripheral direction of the inner race 3 or the outer race 5, the groove 39 being formed in an outside portion in the radial direction in an assembly state. The groove 39 is formed at an axis-directional central portion of the radius-directional outside portion of the cam 7 to penetrate this radius-directional outside portion in the peripheral direction, and has a depth reaching a vicinity of the central portion of the cam 7. One annular spring member 15 is secured to pass through the groove 39 of each cam 7. The spring member 15 biases each cam 7 toward the inner diametrical side. A bottom surface of the groove 39 of the cam 7 is formed in the radially outwardly projecting chevron shape having such an angle as to cause the cam 7 to swing in a contact direction with the inner race outer peripheral surface 11 and the outer race inner peripheral surface 13 upon applying a biasing force of the spring member 15 to the inner diametrical side. Accordingly, each cam 7 is biased to the inner diametrical side by a resilient force of the spring member 15 and is thereby always kept in contact with the inner race outer peripheral surface 11 and the outer race inner peripheral surface 13. The spring member 15 causes each cam 7 to contact the inner race outer peripheral surface 11 and the outer race inner peripheral surface 13 in a torque non-transfer state. In other words, the spring member 15 biases each cam 7 to a torque non-transfer position.

Described next is an operating state of the one-way clutch 1 having the configuration described above according to the embodiment. In the non-load state depicted in FIG. 2A, the cam 7 contacts the inner race outer peripheral surface 11 and the outer race inner peripheral surface 13 by the resiliency of the spring member 15 but does not engage therewith in a torque transferable manner. When the inner race 3 receives a torque to be transferred from this state, the cam 7 swings in such a direction that the inner race 3 engages with the outer race 5 in the torque transferable manner. To be specific, as illustrated in FIG. 2B, when the inner race 3 rotates clockwise or rightwardly as viewed on the sheet surface, the cam 7 kept in contact with the inner race outer peripheral surface 11 and the outer race inner peripheral surface 13 rolls between the inner race outer peripheral surface 11 and the outer race inner peripheral surface 13, thereby swinging to rotate counterclockwise leftwardly. The cam 7 thus swings and is thereby displaced rightward along with the swing as viewed on the sheet surface in FIG. 2B. With the swing thus involving the displacement, the cam 7 engages with the inner race outer peripheral surface 11 and the outer race inner peripheral surface 13, and torque is transferred to the outer race 5 from the inner race 3 owing to this engagement. When the swing of the cam 7 reaches a predetermined magnitude, as illustrated in FIG. 2B, the outer peripheral surface of the cam 7 contacts the axis-directional extending portion 33 of the second retainer 29. According to the embodiment, the outer peripheral surface of the cam 7 contacts the axis-directional extending portion 33 on the side of a rotating direction of the inner race 3 (on the right side as viewed on the sheet surface in FIG. 2B) of the couple of axis-directional extending portions 33, 33 of the frame portion 31b of the second retainer 29 retaining the cam 7.

The second retainer 29 composed of the wire classified as the elongated thin member is not high in rigidity but has the elasticity. Accordingly, the cam 7 further swings in such a direction that the inner race 3 and the outer race 5 engage through the cam 7 from a point of time when the outer peripheral surface of the cam 7 contacts the axis-directional extending portions 33, and is further displaced along with the swing, even in which case the second retainer 29 elastically deforms to become flexural corresponding to the displacement of the cam 7 together with the swing of the cam 7. To be specific, when the cam 7 swings involving the rightward displacement as viewed on the sheet surface in FIG. 2B, the second retainer 29 elastically deforms so that the axis-directional extending portion 33 kept in contact with the cam 7 moves as being pushed by the cam 7 in the same direction as the displacing direction of the cam 7. The second retainer 29 thus elastically deforms corresponding to the swing involving the displacement of the cam 7, and does not therefore inhibit the cam 7 from swinging in the direction of the inner race 3 engaging with the outer race 5. Accordingly, the cam 7 smoothly swings to the engaging position enabling the maximum torque to be transferred while keeping the state held by the second retainer 29.

Upon a further increase of the torque applied to the inner race 3 and when the cam 7 moves to the engaging position enabling the maximum torque to be transferred, the outer peripheral surface of the cam 7 contacts the periphery-directional edge portion 37 of the window 25 of the first retainer 9. According to the embodiment, the outer peripheral surface of the cam 7 contacts the periphery-directional edge portion 37 on the side of the rotating direction of the inner race 3 (on the right side as viewed on the sheet surface in FIG. 2B). Thus, the window 25 of the first retainer 9 is formed in such a size that the cam 7 contacts the periphery-directional edge portion 37 when the cam 7 swings to the engaging position enabling the transfer of the maximum torque. The first retainer 9 is configured to have higher rigidity than the second retainer 29 has, and stably retains the cam 7 swinging to the engaging position enabling the transfer of the maximum torque. The cam 7 is thereby stably retained by the first retainer 9 and the second retainer 29 in the maximum torque transferable state.

Thus, according to the embodiment, each cam 7 can be smoothly moved to the engaging position enabling the transfer of the maximum torque while being stably retained by the second retainer 29. In other words, each cam 7 can sufficiently exhibit its function. The one-way clutch 1 as a whole can stably ensure a torque capacity being transferable in terms of design by surely exhibiting the inherent functions of the plurality of cams 7. Each cam 7 is, when swinging to the engaging position enabling the transfer of the maximum torque, stably retained in the engaging position by the first retainer 9.

The use of the one-way clutch 1 according to the embodiment enables the one-way clutch 1 to be designed by using an optimal number of cams 7 matching with the magnitude of the torque that is to be transferred. The design of the conventional one-way clutch as being flexible to the high torque does not therefore entail increasing the number and the dimension of the cams. As a result, the conventional one-way clutch can be made flexible to the high torque capacity by neither increasing a weight of the one-way clutch nor up-sizing the one-way clutch nor changing the dimension thereof.

Further in an apparatus using the one-way clutch instanced by a starter device etc. of a two-wheeled vehicle, a range of apply to the high torque can be expanded while maintaining the size simply by changing the conventional one-way clutch to the one-way clutch according to the embodiment.

Also when the design is changed to be flexible to the high torque from a low torque, e.g., in the course of designing, the use of the one-way clutch 1 according to the embodiment can provide the flexibility to the high torque without changing a layout of components etc. of assembly peripheral portions while maintaining the size. As a result, it is feasible to reduce extra steps such as redesigning and rearranging the components and to restrain costs from rising. Note that although the embodiment discussed above has exemplified the one-way clutch 1 to transfer the torque to the outer race 5 from the inner race 3, the present invention may be applied to a one-way clutch to transfer the torque to the inner race 3 from the outer race 5.

DESCRIPTION OF REFERENCE NUMERALS AND SYMBOLS 1 one-way clutch
3 inner race
5 outer race
7 cam
9 first retainer
11 inner race outer peripheral surface
13 outer race inner peripheral surface
15 spring member
17 substantially semicircular portion
19 swelling portion
21 cylindrical portion
23 flange portion
25 window
27 round cuts
29 second retainer
31a, 31b frame portion
33 axis-directional extending portion
37 periphery-directional edge portion
39 groove

What is claimed is:

1. A one-way clutch comprising:
an inner race;
an outer race disposed coaxially with the inner race;
a plurality of cams interposed between an outer peripheral surface of the inner race and an inner peripheral surface of the outer race, and serving to transfer torque between the inner race and the outer race;
a retaining mechanism retaining the plurality of cams; and
a spring member biasing the plurality of cams to torque non-transfer positions,
wherein the retaining mechanism includes a first retainer fixed to the outer race and having a cylindrical retaining portion retaining the plurality of cams at predetermined intervals in a circumferential direction, and a second retainer being disposed on an inner diametrical side of the cylindrical retaining portion, retaining the plurality of cams in a swingable manner, and being elastically deformable corresponding to the swings of the plurality of cams when swinging in a torque transferring direction upon engagements of the plurality of cams with the inner race outer peripheral surface and the outer race inner peripheral surface;
wherein the second retainer is a ring-shaped member formed of an elongated thin member bent in a rectangular wavy shape with open portions being alternately directed to one axis-directional side of the one-way clutch and to the other axis-directional side thereof;
wherein the cylindrical retaining portion is disposed between the inner ace and the outer race coaxially with the inner race and the outer race, and a plurality of windows are provided that pass through the cylindrical retaining portion in a radial direction, the plurality of cams being fitted into the windows; and
wherein the elongated thin member bent in the rectangular wavy shape includes rectangular portions each configuring a frame portion with one side or another side being opened, the frame portions are disposed overlapping in the radial direction with the windows provided in the cylindrical retaining portion, and the plurality of cams are respectively retained by the frame portions and the windows overlapped with each other in the radial direction.

2. The one-way clutch according to claim 1, wherein each frame portion is configured to include a couple of axis-directional extending portions, extending in an axial direction and facing each other in a peripheral direction of the elongated thin member, and a periphery-directional extending portion, extending in the peripheral direction of the elongated thin member and connecting one axis-directional ends or the other axis-directional ends of the couple of axis-directional extending portions.

3. The one-way clutch according to claim 2, wherein upon the plurality of cams swinging in a torque transferring direction by engaging with the inner race outer peripheral surface and the outer race inner peripheral surface, each cam swings to contact one of the couple of axis-directional extending portions of the corresponding frame portions, and thereafter contacts one of a couple of edge portions, facing each other in the peripheral direction, of the corresponding window.

4. The one-way clutch according to claim 3, wherein upon the plurality of cams swinging in the torque transferring direction by engaging with the inner race outer peripheral surface and the outer race inner peripheral surface, each cam swings to be displaced with respect to the inner race outer peripheral surface, and contacts the one axis-directional extending portion due to the displacement, and the second retainer elastically deforms so that the one axis-directional extending portion contacting the cam moves in the same direction as the displacing direction of the cam corresponding to the displacement of the cam.

5. The one-way clutch according to claim 3, wherein each window is configured to have a size to contact the corresponding cam upon the cam swinging to an engaging position enabling a transfer of a maximum torque to between the inner race and the outer race.

6. The one-way clutch according to claim 4, wherein each window is configured to have a size to contact the corresponding cam upon the cam swinging to an engaging position enabling a transfer of a maximum torque to between the inner race and the outer race.

7. A one-way clutch comprising:
an inner race;
an outer race disposed coaxially with the inner race;
a plurality of cams interposed between an outer peripheral surface of the inner race and an inner peripheral surface of the outer race, and serving to transfer torque between the inner race and the outer race;
a retaining mechanism retaining the plurality of cams; and
a spring member biasing the plurality of cams to torque non-transfer positions,
wherein the retaining mechanism includes a first retainer fixed to the outer race and having a cylindrical retaining portion retaining the plurality of cams at predetermined intervals in a circumferential direction, and a second retainer being disposed on an inner diametrical side of the cylindrical retaining portion, retaining the plurality of cams in a swingable manner, and being elastically deformable corresponding to the swings of the plurality of cams when swinging in a torque transferring direction upon engagements of the plurality of cams with the inner race outer peripheral surface and the outer race inner peripheral surface;
wherein the second retainer is a ring-shaped member formed of an elongated thin member bent in a rectangular wavy shape with open portions being alternately directed to one axis-directional side of the one-way clutch and to the other axis-directional side thereof, the elongated thin member being constituted by a wire of circular cross section;
wherein the cylindrical retaining portion is disposed between the inner race and the outer race coaxially with the inner race and the outer race, and a plurality of windows are provided that pass through the cylindrical retaining portion in a radial direction, the plurality of cams being fitted into the windows; and
wherein the elongated thin member bent in the rectangular wavy shape includes rectangular portions each configuring a frame portion with one side or another side being opened, the frame portions are disposed overlapping in the radial direction with the windows provided in the cylindrical retaining portion, and the plurality of cams are respectively retained by the frame portions and the windows overlapped with each other in the radial direction.

8. The one-way clutch according to claim 7, wherein each frame portion is configured to include a couple of axis-directional extending portions, extending in an axial direction and facing each other in a peripheral direction of the elongated thin member, and a periphery-directional extending portion, extending in the peripheral direction of the elongated thin member and connecting one axis-directional ends or the other axis-directional ends of the couple of axis-directional extending portions.

9. The one-way clutch according to claim 8, wherein upon the plurality of cams swinging in a torque transferring direction by engaging with the inner race outer peripheral surface and the outer race inner peripheral surface, each cam swings to contact one of the couple of axis-directional extending portions of the corresponding frame portion, and thereafter contacts one of a couple of edge portions, facing each other in the peripheral direction, of the corresponding window.

10. The one-way clutch according to claim 9, wherein upon the plurality of cams swinging in the torque transferring direction by engaging with the inner race outer peripheral surface and the outer race inner peripheral surface, each cam swings to be displaced with respect to the inner race outer peripheral surface, and contacts the one axis-directional extending portion due to the displacement, and the second retainer elastically deforms so that the one axis-directional extending portion contacting the cam moves in the same direction as the displacing direction of the cam corresponding to the displacement of the cam.

11. The one-way clutch according to claim 10, wherein each window is configured to have a size to contact the corresponding cam upon the cam swinging to an engaging position enabling a transfer of a maximum torque to between the inner race and the outer race.

12. The one-way clutch according to claim 9, wherein each window is configured to have a size to contact the corresponding cam upon the cam swinging to an engaging position enabling a transfer of a maximum torque to between the inner race and the outer race.

* * * * *